United States Patent
Stewart, Jr.

(10) Patent No.: US 8,925,246 B1
(45) Date of Patent: Jan. 6, 2015

(54) PLANT TRELLIS SYSTEM

(71) Applicant: Donald J. Stewart, Jr., Merced, CA (US)

(72) Inventor: Donald J. Stewart, Jr., Merced, CA (US)

(73) Assignee: This Town, LLC, Merced, CA (US)

( * ) Notice: Subject to any disclaimer, the term of this patent is extended or adjusted under 35 U.S.C. 154(b) by 91 days.

(21) Appl. No.: 13/735,009

(22) Filed: Jan. 6, 2013

Related U.S. Application Data

(60) Provisional application No. 61/584,162, filed on Jan. 6, 2012.

(51) Int. Cl.
*A01G 9/12* (2006.01)

(52) U.S. Cl.
CPC .......................................... *A01G 9/12* (2013.01)
USPC ..................................... 47/70; 47/66.7; 47/45

(58) Field of Classification Search
CPC ......................................................... A01G 9/12
USPC .............................. 47/70, 39, 45, 44, 66.6, 67
See application file for complete search history.

(56) References Cited

U.S. PATENT DOCUMENTS

| | | | | |
|---|---|---|---|---|
| 155,525 A | * | 9/1874 | Landers | ............................. 47/67 |
| 1,146,891 A | | 7/1915 | Maas | |
| 2,083,678 A | | 6/1937 | Wilson | |
| 3,041,783 A | * | 7/1962 | Pezdek et al. | ...................... 47/44 |
| 4,349,172 A | * | 9/1982 | Banks, Jr. | ...................... 248/318 |
| 4,631,861 A | | 12/1986 | Wuthrich | |
| 4,669,693 A | * | 6/1987 | Kagan | ............................ 248/318 |
| 5,249,390 A | | 10/1993 | Purohit et al. | |
| 5,778,597 A | * | 7/1998 | Klevstad | ............................ 47/47 |
| 6,311,428 B1 | | 11/2001 | Marino et al. | |
| 6,370,820 B1 | * | 4/2002 | Moss | ................................. 47/81 |
| 7,032,347 B2 | * | 4/2006 | Hartman | ............................ 47/67 |
| 2007/0130824 A1 | | 6/2007 | Teich | |

FOREIGN PATENT DOCUMENTS

JP    2002335774 A  * 11/2002  ............... A01G 9/12

* cited by examiner

*Primary Examiner* — Son T Nguyen
(74) *Attorney, Agent, or Firm* — Temmerman Law Office; Mathew J. Temmerman

(57) ABSTRACT

A plant trellis system for growing plants on hard surfaces such as patios or decks is disclosed. The system comprises a trellis base having a plurality of cutouts, a pot having a plurality of legs protruding from the bottom surface, and a plurality of wire mesh panels supported on the trellis base. The plurality of legs is inserted into the plurality of cutouts forming a firm connection between the trellis base and the pot. The trellis base further comprises a groove on each side where a base wire of the plurality of wire mesh panels is inserted. The trellis base also comprises a plurality of notches on each side to receive the vertical wires coming from the base wire. Clips are used to attach each wire mesh panel to the adjacent wire mesh panel. The system is portable and stable beyond the boundaries of the pot to support larger plants.

10 Claims, 5 Drawing Sheets

PLANT TRELLIS SYSTEM

RELATED APPLICATIONS

This application claims priority from the U.S. provisional application with Ser. No. 61/584,162, which was filed on Jan. 6, 2012. The disclosure of that provisional application is incorporated herein as if set out in full.

BACKGROUND OF THE DISCLOSURE

1. Technical Field of the Disclosure

The present application is related in general to gardening structures, and in particular to a trellis system suitable for growing larger plants or vegetables, such as tomatoes, in pots on hard surfaces, such as patios or decks.

2. Description of the Related Art

A major problem associated with growing plants, and in particular larger plants such as vegetables and some flowers in portable pots is the lack of support above the pot to hold the vines, stalks, or other parts of the plant as they grow above the top of the pot. Frequently, these upper portions of the plant are the most valuable as they contain the fruits, vegetables, or flowers which the grower desires to eventually harvest. These valuable portions of the plants must be exposed to sufficient sunlight, and simultaneously provided with support so that they do not bend and either break or hang down to areas exposed to less sunshine or where they will contact undesirable surfaces and thus stunt the growth and production of the desired products.

This problem is especially difficult to solve if a portable plant pot is used to grow plants indoors or on hard surfaces such as patios, decks, and driveways. When a pot is located on soil it is possible to drive a mast, stake, trellis, cage, or other similar structure directly into the soil next to the pot in order to provide the necessary support structure for the plant. A drawback of this approach is that after the plant begins to grow and become entwined with the trellis it is impossible to move the pot/plant without either damaging the plant or dismantling the trellis.

One approach to combining a trellis with a portable pot is to insert the base of a trellis directly into the sides of a pot. The disadvantage of this approach is that the trellis may be of limited size because the size of the trellis is restricted by the size of the pot. This approach may also provide insufficient stability for larger plants. Attempts have been made to compensate for this instability by centering the trellis over the center of the pot so that the center of gravity is over the center of the pot. Conventional means for executing this approach require extra effort from the grower in training the plant to grow up the trellis and also greatly restrict the amount of trellis space available to support and contain the plant. Many attempts have been made to combine a trellis system with a portable pot for convenience.

Recent advancements in the art disclose a trellis apparatus formed of separate, substantially identical, generally L-shaped rigid pieces each having short and long, generally straight, elongated portions that meet across a generally right angle bend. Each has a loop means defined adjacent to the free end of the short portion. To set-up the trellis apparatus, the loop means on one piece may be inter-fitted near the bend onto the long portion of an adjacent piece. When all pieces are inter-fitted and when the free end of each long portion is inserted directly into the plant-carrying dirt, it defines a stable, closed, three-dimensional containment ring surrounding the plant. Loop means can also be formed on the free end of the long portion for improving stability of the piece supported within the dirt and for safety. However, the size of the trellis is restricted by the size of the pot, resulting in the trellis apparatus being unable to support larger plants.

One of the existing trellis systems describes a combination portable plant pot and trellis for growing plants, flowers, vines and the like, and a detachable circumferential trellis extending above the pot. The preferred attachment means have downwardly extending extensions on support posts of the trellis, and these extensions have a lip to engage ledges along the side of the pot, reachable through apertures in the pot rim. This secures the trellis to the pot and provides the necessary upper support for the branches and vines of growing plants to expose them to maximum sunlight and air. However, the circumferential trellis is confined to the boundaries of the pot and does not provide support for plants beyond the boundaries of the pot. Hence, it is difficult to grow larger plants in this pot.

Another existing trellis system discloses a plant support comprising a series of longitudinally extending supporting rods with rings interlaced thereon and interlaced with each other and adjustable along said rods, with a plurality of longitudinal supporting members of similar character arranged in different horizontal planes provided with inter-engaging, interlocking, and adjustable rings and means for supporting the longitudinal members in different horizontal planes. The various rings are adapted to be brought into substantially vertical registration, one with the other. However, this system is not portable. Hence, it is impossible to move the plant and the trellis system once it is established in a particular spot.

Various other trellis systems exist that provide support to growing plant foliage. One such trellis system includes a vertical support frame assembly of adjustable height to which is attached a mesh netting and supporting stakes, forming an extendable garden trellis. Another system includes an adequately anchored base surmounted by a spiral trellis for supporting plants without the necessity of tying the plant to the support. Some other systems include a trellis composed of a plurality of separable components capable of disassembly, and collapsible to minimum size for convenient storage yet capable of assembly into a unitary trellis structure of variable height and diameter to accommodate plants of differing sizes. However, some of these systems are supported by direct insertion into the soil and are hence not portable. Some other systems that may be inserted into a portable pot are limited in size. Other systems require the use of trellis netting that is time consuming to tie and frequently becomes tangled.

Based on the foregoing there is a demonstrable need for a plant trellis system suitable for growing plants on hard surfaces such as patios, decks or driveways. Such a needed plant trellis system would comprise a trellis base and a pot accommodated on the trellis base. The system would also comprise a plurality of wire mesh panels accommodated on the trellis base for providing support to the plant. The system would provide a free standing support for growing larger plants on any relatively flat surface that is light, firm and easily assembled. Further, the system would be portable and capable of moving as a single unit without damaging the plant or dismantling the trellis. The system would also break down into flat pieces for easy storage and shipping. Finally, the trellis system would extend and be stable beyond the boundaries of the pot allowing it to support larger plants. The present invention overcomes prior art shortcomings by accomplishing these critical objectives.

SUMMARY OF THE DISCLOSURE

To minimize the limitations found in the prior art, and to minimize other limitations that will be apparent upon the reading of this specification, the preferred embodiment of the present invention provides a plant trellis system suitable for growing plants on hard surfaces such as patios, decks, or driveways.

The present application discloses a plant trellis system suitable for use on hard surfaces and with large plants or vegetables such as tomatoes. The plant trellis system comprises a trellis base disposed under a pot or plant container, the trellis base configured to securely hold the base of at least two interconnected flat wire mesh panels, and preferably four interconnected flat wire mesh panels.

The preferred embodiment of the plant trellis system comprises a trellis base having a plurality of cutouts, a pot having a plurality of legs protruding from its bottom surface, and a plurality of wire mesh panels supported on the trellis base. The plurality of cutouts of the trellis base is configured to accommodate the plurality of legs protruding from the bottom surface of the pot. The bottom of the plurality of legs rests on the hard surface on which the plant trellis system may be placed, while the remainder of the bottom surface of the pot rests on the trellis base. The weight of the pot plus the soil and plant serves to weigh down the plant trellis system thereby providing stability. The upper portion of the plurality of legs fits snugly in the plurality of cutouts of the trellis base. This ensures a firm connection between the pot and the trellis base such that the plant trellis system works and flexes together as a single unit.

Each side of the trellis base comprises a groove at the bottom surface to accommodate a base wire of one of the plurality of wire mesh panels. Each side of the trellis base also comprises a plurality of notches to accommodate a plurality of vertical wires coming off of the base wire of the wire mesh panels. Clips may also be positioned at the top surface of the trellis base for serving a similar function to the grooves and the plurality of notches. A wire mesh panel is secured on each side of the trellis base by interfacing the base wire of the wire mesh panel with the groove on the side, and interfacing the plurality of vertical wires coming from the base wire with the plurality of notches on the side. Clips or hinges are used to attach each wire mesh panel to the adjacent wire mesh panel.

The plant trellis system may be placed on any generally flat surface regardless of the nature of that surface, i.e. soil, patio, driveway, deck. Each of the sides of the trellis base of the plant trellis system extend a sufficient distance out from the sides of the pot to accommodate a larger plant. In the preferred embodiment, the trellis base is made from a hard plastic material although any suitable material known in the art including but not limited to metal, ceramic, wood, composite, and concrete may be used. For patios exposed to wind it would be beneficial to have the trellis base covered with a plastic skin and to include a plug so that it could be filled with water. The added weight of the water improves stability for windy conditions.

The plant trellis system provides a freestanding support for growing larger plants on hard surfaces such as patios, decks or any other relatively flat surface. The system is portable and can be moved as a single unit without damaging the plant or dismantling the trellis. The system can also be easily assembled and disassembled, and laid down into flat pieces for easy storage and shipping. Further, the trellis system extends and is stable beyond the boundaries of the pot making it easy to support large plants.

A first objective of the present invention is to provide a plant trellis system that is free standing and is suitable for growing larger plants on hard surfaces.

A second objective of the present invention is to provide a plant trellis system that is portable.

A third objective of the present invention is to provide a plant trellis system that breaks down into flat pieces for easy storage and shipping.

Another objective of the present invention is to provide a plant trellis system that does not require the use of trellis netting that is time consuming to tie and frequently becomes tangled.

A further objective of the present invention is to provide a plant trellis system that extends all around a pot.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

Figure 1:
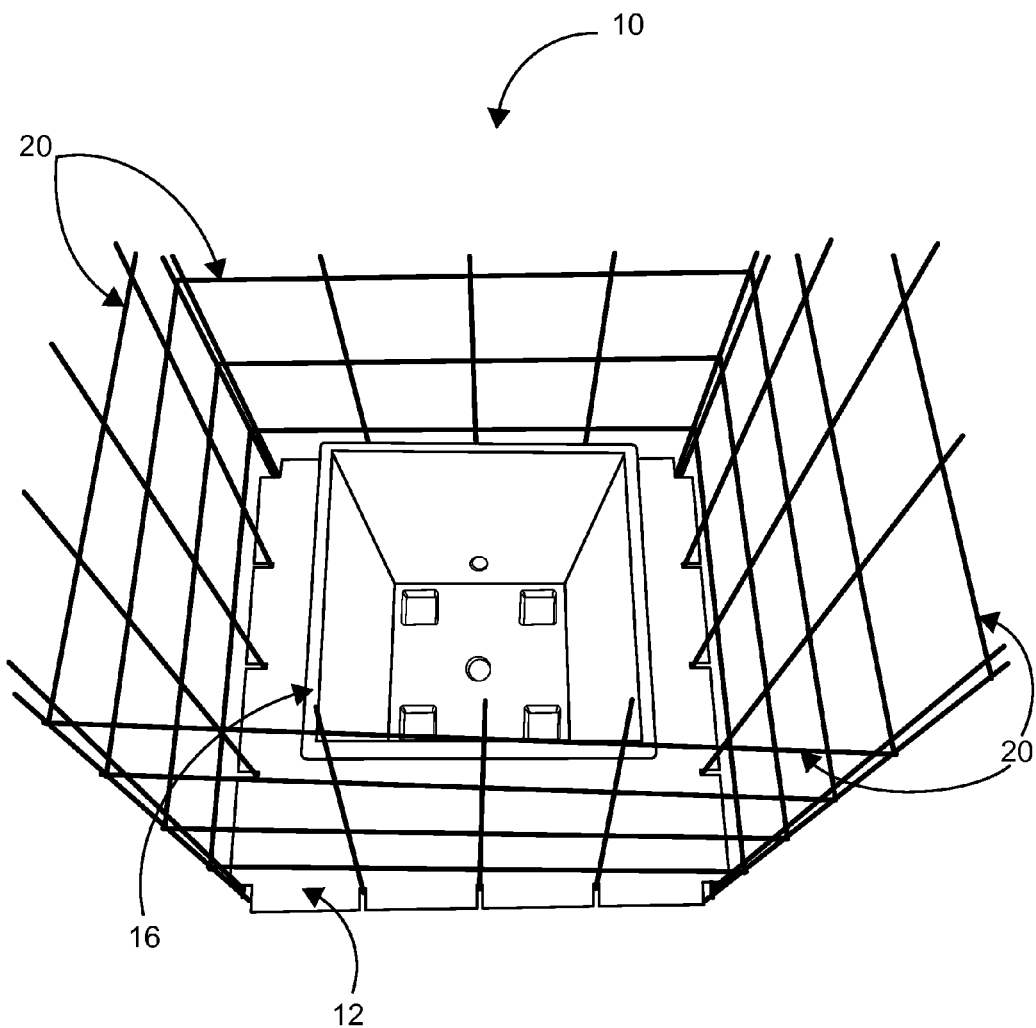
FIG. 1 is a top perspective view of a preferred embodiment of a plant trellis system.

FIG. 1 is a top perspective view of the preferred embodiment of the plant trellis system 10. The plant trellis system 10 comprises a trellis base 12 having a plurality of cutouts 14 (See FIG. 3). Disposed on top of the trellis base 12 is a pot 16 having a plurality of legs 18 (See FIG. 2) protruding from the bottom surface. A plurality of wire mesh panels 20 is supported on the trellis base 12. The trellis base 12 is configured to securely hold the bottom surface of the pot 16 and the base of the plurality of wire mesh panels 20 to form a single unit that work and flex together.

Figure 2:
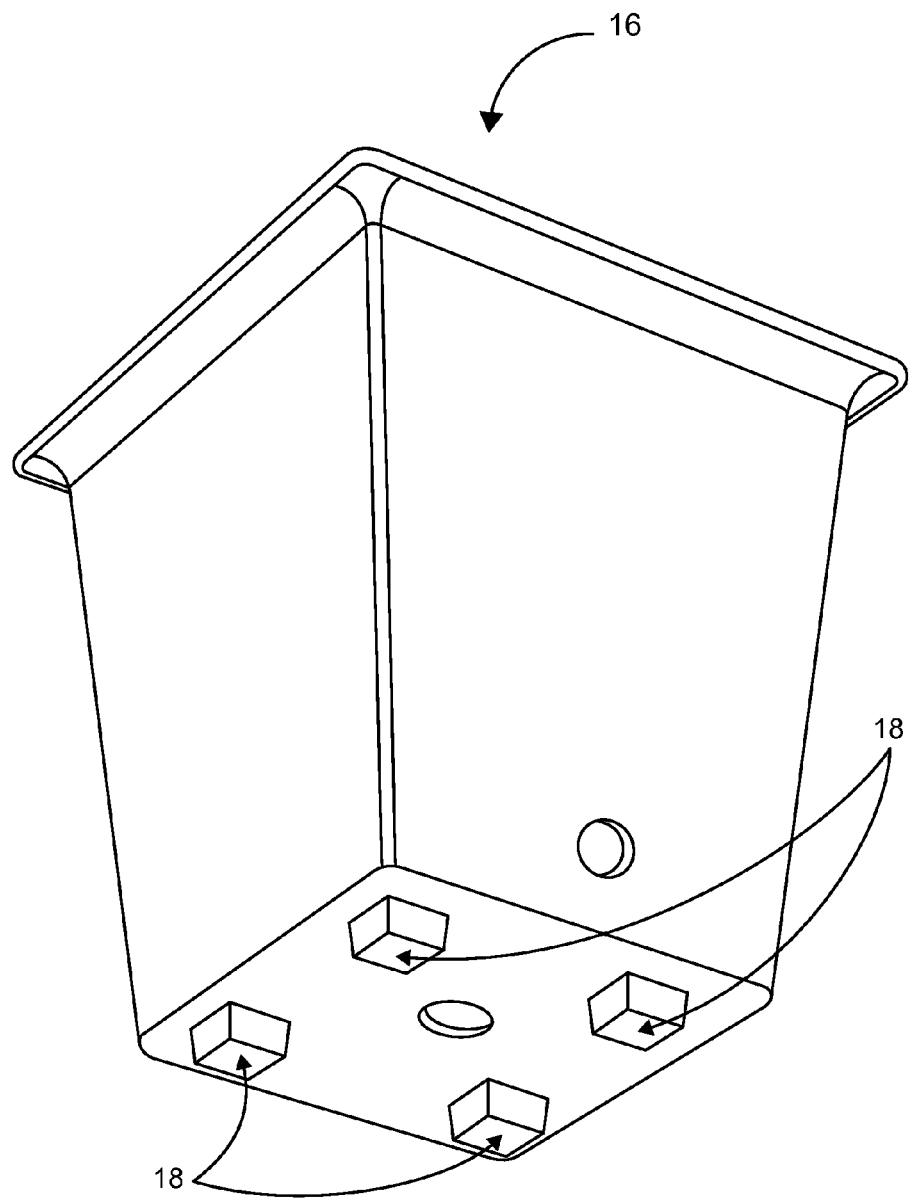
FIG. 2 is a bottom perspective view of an exemplary pot for use in connection with the plant trellis system.

FIG. 2 is a bottom perspective view of an exemplary pot 16 for use in connection with the plant trellis system 10. The pot 16 comprises a plurality of legs 18 on the bottom surface. The plurality of legs 18 raise the bottom surface of the pot 16 approximately one inch above a hard surface on which the plant trellis system 10 may be placed. The upper portion of the plurality of legs 18 fits snugly in a plurality of cutouts 14 (See FIG. 3) of the trellis base 12 such that there is a firm connection between the pot 16 and the trellis base 12. It is noted that the plant trellis system 10 is compatible with pots that do not have the plurality of legs 18, and may be used with any pot as known in the art.

Figure 3:
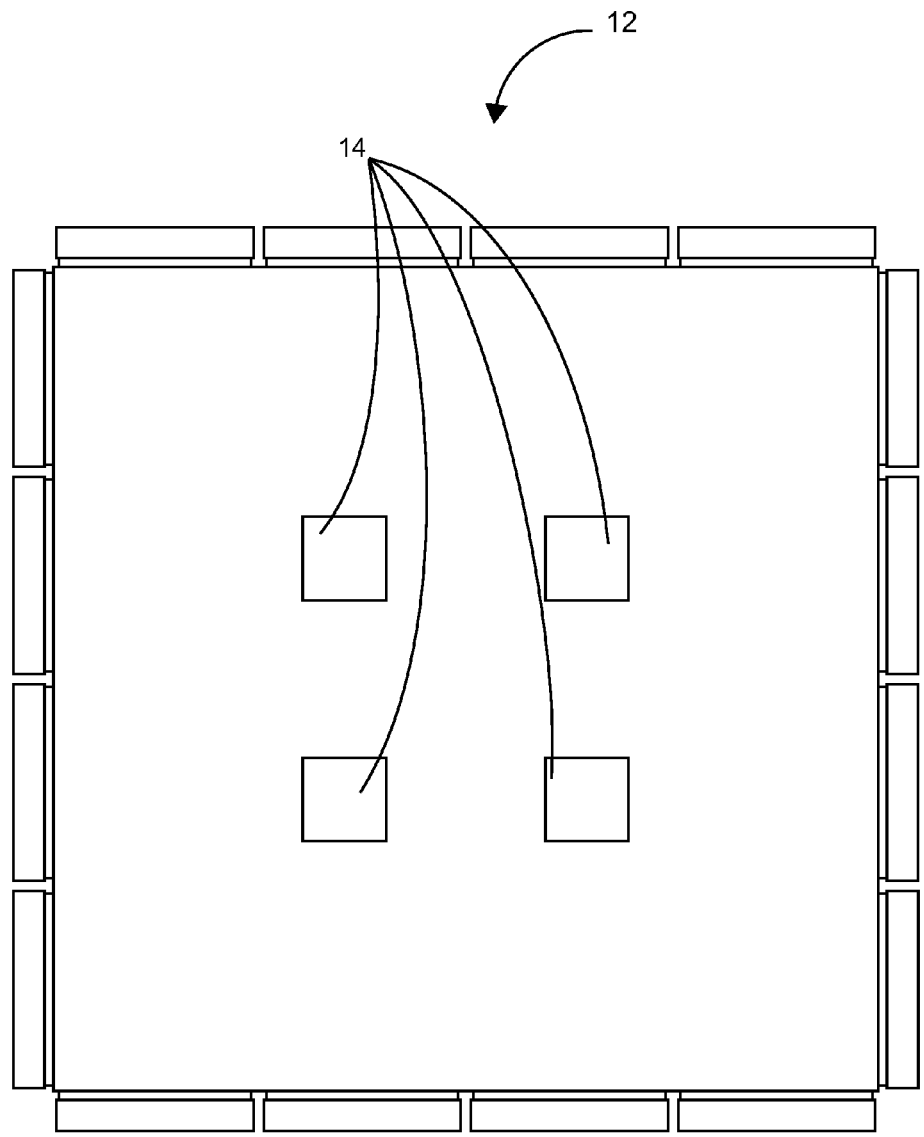
FIG. 3 is a bottom view of a trellis base of the plant trellis system.

FIG. 3 is a bottom view of the trellis base 12 of the plant trellis system 10. The trellis base 12 comprises a plurality of cutouts 14 configured to accommodate the corresponding plurality of legs 18 on the pot 16. The trellis base 12 is configured such that the bottom surface of the plurality of legs 18 rest on the hard surface on which the plant trellis system 10 is placed, while the remainder of the bottom surface of the pot 16 rests on the trellis base 12. This arrangement allows similar pots to be at a similar height regardless of whether they are used with the plant trellis system 10. It is important that the remainder of the bottom surface of the pot 16 rests on the trellis base 12 so that the weight of the pot 16 plus the soil and plant serves to weigh down the plant trellis system 10. In addition, the number and configuration of the plurality of cutouts 14 may be varied according to preference.

Figure 4:
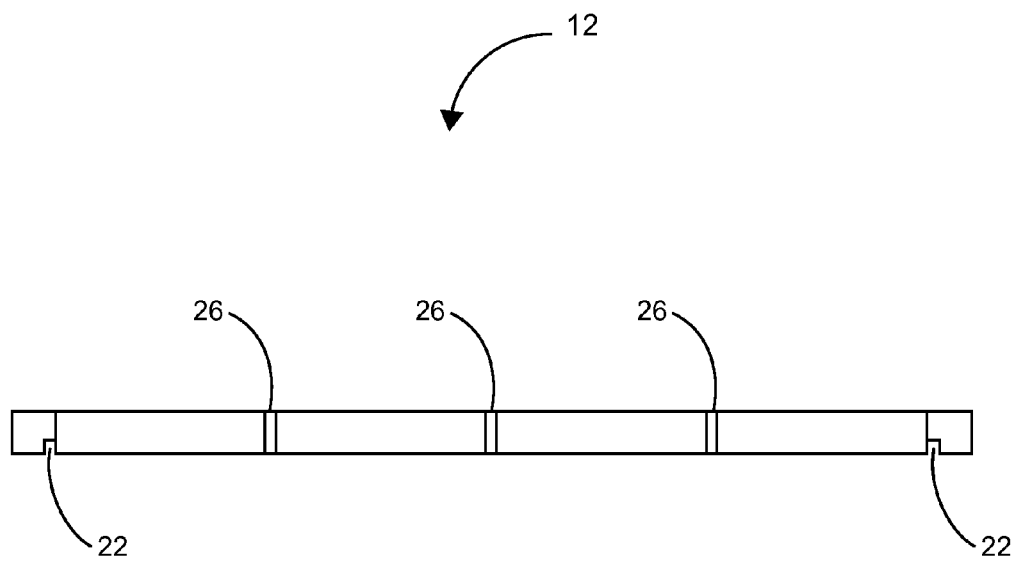
FIG. 4 is a side view of the trellis base of the plant trellis system.

FIG. 4 is a side view of the trellis base 12 of the plant trellis system 10. The trellis base 12 further comprises a groove 22 on the bottom surface of each of the sides of the trellis base 12. The groove 22 is dimensioned to receive a base wire 24 (See FIG. 5) of the plurality of wire mesh panels 20. The trellis base 12 of the plant trellis system 10 also comprises a plurality of notches 26 along each of the sides of the trellis base 12. The plurality of notches 26 is spaced and dimensioned to accommodate a plurality of vertical wires 28 (See FIG. 5) coming off the base wire 24 of the plurality of wire mesh panels 20.

In an alternative embodiment of the plant trellis system 10, clips (not shown) may be positioned at the top surface of the trellis base 12 for serving a similar function to the plurality of grooves 22 and notches 26. The clips substitute for the grooves 22 by virtue of being positioned midway between the plurality of vertical wires 28 of the plurality of wire mesh panels 20. The clips may have a clip notch near their top end through which the base wire 24 may be pushed, thereby securing it. With the base wire 24 pushed through the notch of the aligned clip, the wire mesh panel 20 may be held in place but still able to swing up and down. The clips that may be substituted for the notches 26 may be positioned at the vertical wires 28 of the wire mesh panel 20 such that when the wire mesh panel 20 is swung up to vertical position it may be held in place by a vertical notch at the upper end of the clip. The advantage to this alternative mode is due to the base wire 24 being positioned on top rather than underneath the trellis base 12, the device becomes easier to set up and operate. The downside to this alternative is increased complexity and manufacturing cost.

Figure 5:
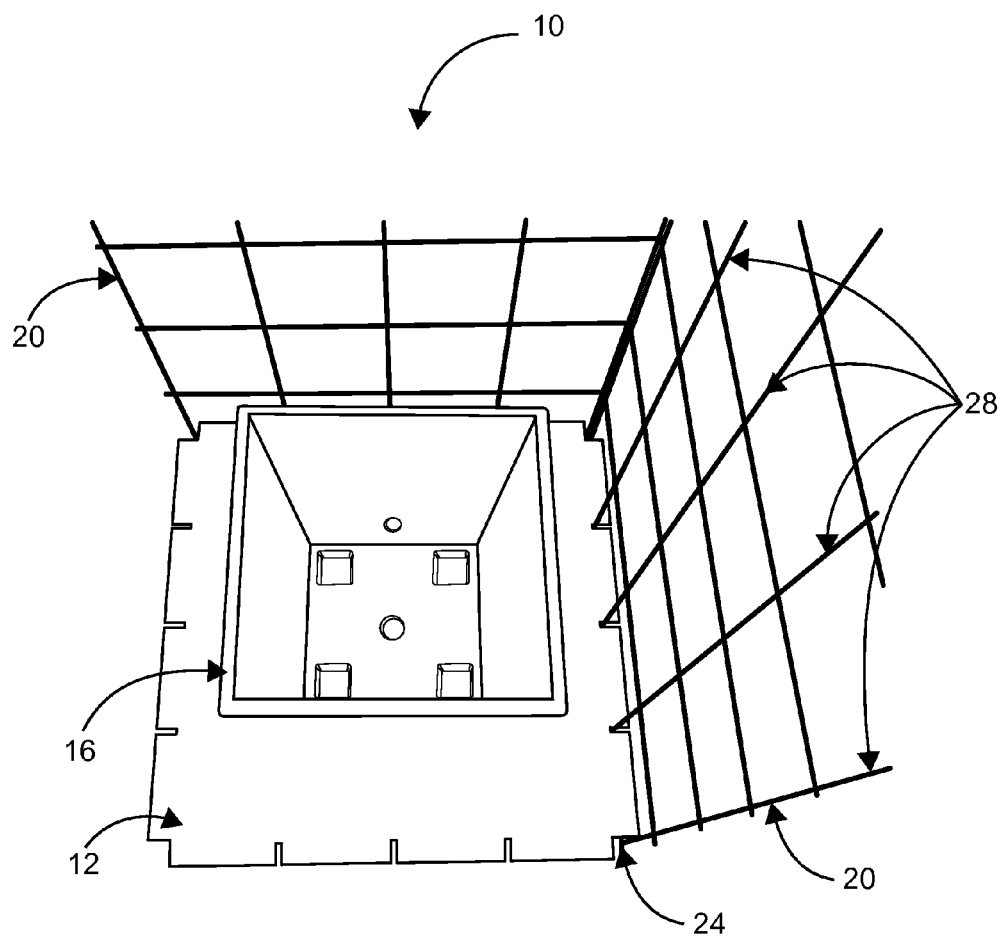
FIG. 5 is a top perspective view of an alternate configuration of the plant trellis system.

FIG. 5 is a top perspective view of an alternate configuration of the plant trellis system 10. The figure shows an assembled plant trellis system 10 with two wire mesh panels 20. Each wire mesh panel 20 is attached to the trellis base 12 by interfacing the base wire 24 of the wire mesh panel 20 with a groove 22, and interfacing the plurality of vertical wires 28 coming from the base wire 24 with the plurality of notches 26. Clips (not shown) are used to attach each wire mesh panel 20 to the adjacent wire mesh panel 20. The plant trellis system 10 may be assembled by using at least two wire mesh panels 20 and preferably four wire mesh panels 20 according to the user's needs. The plant trellis system 10 may extend and be stable beyond boundaries of the pot 16. That is, if a pot 16 is twelve inches to a side, the trellis base 12 may be eighteen inches, or twenty four inches, or any size greater than twelve inches to a side.

A method of assembling the plant trellis system 10 includes the following steps. First the trellis base 12 and the pot 16 are provided to the user. The plurality of legs 18 of the pot 16 are inserted into the corresponding plurality of cutouts 14 of the trellis base 12. The base wire 24 of each of a plurality of wire mesh panels 20 is inserted through the groove 22 on the bottom surface of each side of the trellis base 12. The plurality of vertical wires 28 coming from the base wire 24 of each of the plurality of wire mesh panels 20 is then inserted through the plurality of notches 26 on each side of the trellis base 12. Each of the plurality of wire mesh panels 20 is then interconnected to the adjacent wire mesh panel 20 by a connection means (not shown). The connection means is selected from the group consisting of: clips and hinges.

It is noted that though a hard surface is recited above, the plant trellis system 10 may be placed on any generally flat surface regardless of the nature of that surface, i.e. soil, patio, driveway, deck.

In the preferred embodiment, the trellis base 12 is made from a hard plastic material. In alternative embodiments the trellis base 12 may be made from any suitable material known in the art including but not limited to metal, ceramic, wood, composite, and concrete. In an additional alternative embodiment, the trellis base 12 comprises a plastic shell/skin and a plug configured such that the trellis base 12 may be filled with water. The added weight of the water provides improved stability for windy conditions. The wire mesh panel 20 is of the type typically known in gardening or construction and may comprise ⅛-inch wire.

In another embodiment of the invention, the plant trellis system 10 comprises two wire mesh panels 20 having the base wires 24 of the two wire mesh panels 20 attached to opposite sides of the trellis base 12, and having the tops of the wire mesh panels 20 joined together in a "roof" formation creating a shape similar to an inverted V where the top of the "roof" structure is a line above, and bisecting, the trellis base 12, and joined together by clips. In order to accommodate the wire mesh panel 20 at an angle, the plurality of notches 26 in this embodiment would preferably be slanted at an angle parallel with the slanted angle of the wire mesh panels 20 forming the two sides of the "roof" or inverted V. In yet another alternative embodiment, the plant trellis system 10 just described may be combined with a previously described embodiment wherein the base wire 24 of the wire mesh panels 20 was situated above the trellis base 12. In this combined embodiment the clips positioned at the plurality of vertical wires 28 of the wire mesh panels 20, and used to hold these wires in place, may be eliminated.

The presently disclosed system is advantageous because it provides a light and firm support for larger plants such as tomatoes to be grown on hard surfaces such as patios, decks and driveways. The plant trellis system 10 is free standing and can be moved from one place to another without damaging the plant or dismantling the system 10. Each of the sides of the trellis base 12 extends a sufficient distance out from the sides of the pot 16 to accommodate a larger plant. The system 10 can be easily assembled and disassembled and the components can be laid flat for easy storage and shipping. Furthermore, there is no trellis netting that is time consuming to tie and constantly becomes entangled.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

I claim:

1. A plant trellis system for growing and supporting plants on a flat surface, the plant trellis system comprising:
   a trellis base having a plurality of cutouts on a top surface thereof and a plurality of grooves and a plurality of notches on each side of a bottom surface thereof;
   a pot disposed on top of the trellis base having a plurality of legs protruding from a bottom surface thereof; and
   a plurality of wire mesh panels supported on the trellis base, each wire mesh panel having a base wire inserted into each groove on each side of a bottom surface thereof, a plurality of vertical wires extended from the base wire and a plurality of horizontal wires joined with the plurality of vertical wires;
   whereby the trellis base is configured to securely hold the bottom surface of the pot and a base of the plurality of wire mesh panels to form a single unit.

2. The plant trellis system of claim 1 wherein the plurality of cutouts of the trellis base is configured to accommodate the plurality of legs of the pot to form a firm connection between the trellis base and the pot.

3. The plant trellis system of claim 1 wherein the plurality of legs rests on the flat surface while the remainder of the bottom surface of the pot rests on the trellis base.

4. The plant trellis system of claim 1 wherein the plurality of vertical wires coming from the base wire of each of the plurality of wire mesh panels is secured within the plurality of notches on each side of the bottom surface of the trellis base.

5. The plant trellis system of claim 1 wherein each of the plurality of wire mesh panels is connected to an adjacent wire mesh panel by a connection means selected from the group consisting of: clips and hinges.

6. A plant trellis system for growing and supporting plants on a flat surface, the plant trellis system comprising:
   a trellis base having a plurality of cutouts on a top surface thereof and a plurality of grooves and a plurality of notches on each side of a bottom surface thereof;
   a pot having a plurality of legs protruding from a bottom surface thereof, the plurality of legs being accommodated by the plurality of cutouts of the trellis base wherein the plurality of legs rest on the flat surface while the remainder of the bottom surface of the pot rests on the trellis base; and
   a plurality of wire mesh panels supported on the trellis base, each wire mesh panel having a base wire inserted into each groove on each side of a bottom surface thereof, a plurality of vertical wires extended from the base wire and a plurality of horizontal wires joined with the plurality of vertical wires;
   whereby a plant growing in the pot is supported by the trellis base and the plurality of wire mesh panels.

7. The plant trellis system of claim 6 wherein each of the plurality of wire mesh panels is connected to an adjacent wire mesh panel by a connection means selected from the group consisting of: clips and hinges.

8. The plant trellis system of claim 6 is made of plastic.

9. A method of assembling a plant trellis system, the method comprising the steps of:
   a) providing a trellis base and a pot of the plant trellis system;
   b) inserting a plurality of legs of the pot into a corresponding plurality of cutouts of the trellis base;
   c) inserting a base wire of each of a plurality of wire mesh panels through a groove on each side of a bottom surface of the trellis base;
   d) inserting a plurality of vertical wires coming from the base wire of each of the plurality of wire mesh panels through a plurality of notches on each side of the bottom surface of the trellis base; and
   e) interconnecting each of the plurality of wire mesh panels to an adjacent wire mesh panel by a connection means.

10. The method of claim 9 further comprises interconnecting each of the plurality of wire mesh panels to the adjacent wire mesh panel by the connection means selected from the group consisting of: clips and hinges.

* * * * *